United States Patent
Verveniotis

(10) Patent No.: US 6,878,904 B2
(45) Date of Patent: Apr. 12, 2005

(54) GRILLING STATION

(76) Inventor: Nicholas G. Verveniotis, 8405 Glenerye St., Darien, IL (US) 60561

( * ) Notice: Subject to any disclaimer, the term of this patent is extended or adjusted under 35 U.S.C. 154(b) by 0 days.

(21) Appl. No.: 10/734,986

(22) Filed: Dec. 15, 2003

(65) Prior Publication Data

US 2004/0177770 A1 Sep. 16, 2004

Related U.S. Application Data

(60) Provisional application No. 60/442,622, filed on Jan. 27, 2003.

(51) Int. Cl.[7] ............................ A47J 37/06; F27D 11/02
(52) U.S. Cl. ....................... 219/394; 219/404; 219/412; 99/372; 99/374; 99/377
(58) Field of Search ................................ 219/394, 404, 219/412; 99/372, 374, 377, 427

(56) References Cited

U.S. PATENT DOCUMENTS

| | | | | |
|---|---|---|---|---|
| 2,764,664 A | * | 9/1956 | Stewart | ...................... 219/412 |
| 2,893,307 A | * | 7/1959 | Rodriquez | .................. 219/404 |
| 3,523,181 A | * | 8/1970 | Beasley | ....................... 219/404 |
| 5,724,886 A | * | 3/1998 | Ewald et al. | .................. 99/374 |
| 6,091,057 A | * | 7/2000 | Asami et al. | ................ 219/404 |

FOREIGN PATENT DOCUMENTS

JP    2002243174 A   *  8/2002

* cited by examiner

*Primary Examiner*—Joseph Pelham

(57) ABSTRACT

A grilling station for simultaneously grilling a variety of foods. The station includes a plurality of grilling ovens. Each of the grilling ovens has a housing with an opening for loading food into that housing. A first grilling unit is mounted in each housing for supporting food. A second grilling unit is mounted in each housing positionable above each respective first grilling unit and being vertically moveable in relation to the respective first grilling unit. The first and second grilling units in each of the housings connected to a respective control assembly to determine selectively the length of time energy is supplied to the grilling units providing selective separate grilling times in each of the housings.

20 Claims, 4 Drawing Sheets

GRILLING STATION

CROSS-REFERENCE TO RELATED APPLICATION

This application is a continuation-in-part of patent application Ser. No. 60/442,622, filed Jan. 27, 2003, entitled "Grilling Oven".

BACKGROUND OF THE INVENTION

This invention relates to an improved grilling station having a plurality of identical improved grilling ovens particularly adapted for use in a food preparation environment, such as, a commercial restaurant or the like.

A problem frequently encountered in the operation of a commercial food preparation facility, such as a restaurant revolves around grilling foods. In a typical restaurant environment, a grill or broiler is used to cook foods such as steak, fish and chops. The steak is placed on the grill and the grilling person turns the steak after a period of time. The steak is then removed after a time to produce the steak with the desired amount of cooking, such as, rare, medium rare, medium, medium well, or well done. The degree of cooking of the steak is in great part dependant upon the experience, skill, ability, mood and judgment in particular of the grilling person.

As a further example, should an order come into the kitchen for several steaks, one or more of which is to be well done, one or more of which is to be rare, one or more of which is to be medium, and one or more of which is to be medium well, the grilling person must place the steaks on the grill at different times, stagger the times that the steaks are on the grill for turning and for removal from the grill. Failure of the grilling person to monitor the cooking time of each of the steaks may result in one or more of the steaks being overcooked or undercooked. In the event that a steak is overcooked or undercooked and delivered at a temperature that is not desired when the steak is overcooked or undercooked, the customer is dissatisfied and the steak is sent back to the kitchen which disrupts the operation of the kitchen. Service is disrupted at the table. In addition, the restaurant may have steaks which may not be readily sold and a dissatisfied customer.

It is an object of the present invention to provide a grilling station having a plurality of individual locations to grill individual foods, such as, steaks, to produce food which is cooked a proper amount of time. In addition, the food is grilled on the top and the bottom at the same time to eliminate the need for turning of the food. Furthermore, an indicator light is provided with each unit which indicates that the cooking for a particular unit has been completed. It follows that if it is not necessary for a grilling person to watch food on a grill. Thus, an experienced grilling person is not required, thereby effecting an economy in the labor rate. It is a further object to provide an improved grilling oven heated electrically so that the electricity may be interrupted when the oven is not is use to effect economy in operation. An additional object of the present invention is to provide a grilling oven wherein food may be easily loaded onto the grill and easily removed therefrom. The unit will also operate with the upper grill raised for use of cooking fish or melting cheese or other foods above burgers, steaks, or the like. Other objects and uses of the present invention will become readily apparent to those skilled in the art upon perusal of the following specification in light of the accompanying drawing.

BRIEF SUMMARY OF THE INVENTION

The present invention is an improved grilling station for grilling a variety of foods simultaneously. The station includes a plurality of individual grilling ovens. Each of the ovens has a housing with an opening in the housing for loading food into the respective housing. Each oven has a first grilling unit for supporting food in the respective housing. Each grilling oven also includes a second grilling unit positionable above the respective first grilling unit and being movable relative to the first grilling unit. A control assembly is connected to the grilling units to determine selectively the length of time energy is supplied to the grilling units in each of the individual ovens to provide a separate grilling time in each of the grilling ovens.

DETAILED DESCRIPTION OF THE INVENTION

Figure 1:
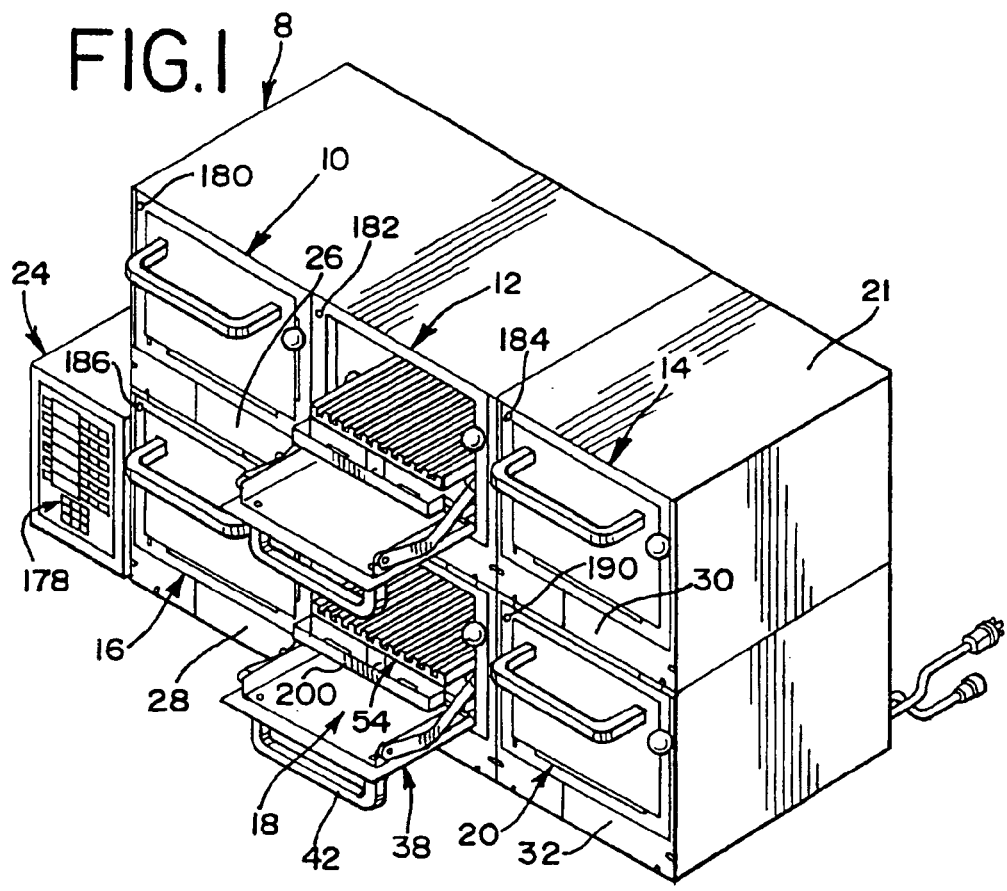
FIG. 1 is a perspective view of a grilling station embodying this invention, in this instance, the station having six individual grilling ovens with a control assembly connected to the grilling ovens for regulating the grilling time in each of the ovens.

Referring now to the drawings, and especially FIG. 1, a grilling station 8 is shown therein including six improved individual grilling ovens 10, 12, 14, 16, 18 and 20 enclosed in a cabinet 21. The construction of each of the grilling ovens is identical to each other grilling oven. The station includes a control assembly 24 which is electrically connected to each of the grilling ovens to deliver electrical energy to each of the individual grilling ovens and to regulate the time of heating of each of the grilling ovens.

Grilling ovens 10 and 12 have a common grease tray 26, and grilling ovens 16 and 18 have a common grease tray 28. Grilling ovens 14 and 20 have individual grease trays 30 and 32, respectively. The grease trays collect grease generated by cooking in the ovens and are connected to the troughs to receive grease from the troughs.

Figure 2:
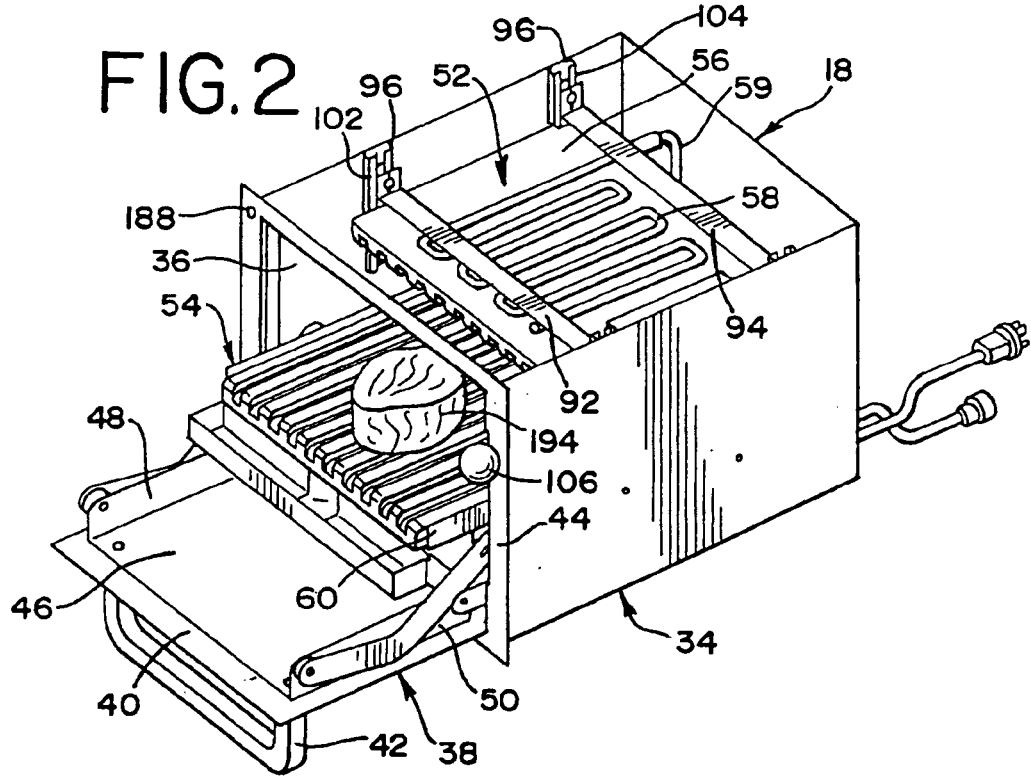
FIG. 2 is a perspective view of a portion of one of the grilling ovens of FIG. 1 with a top removed and shown in an open attitude for loading or unloading food in the oven, and a fillet positioned on a first grilling unit.

Referring now to FIG. 2, grilling oven 18 is shown therein with the top removed in order to show better the construction of the oven. Grilling oven 18 includes a housing 34 with an opening 36 on one side. A hinged door 38 is pivotally connected to the housing for selectively closing opening 36. Hinged door 38 includes a face portion 40 with a handle 42 connected thereto. Face portion 40 is hingedly connected to yolk 44, which is an integral portion of housing 36. Door 38 has a inner panel 46 with elongated ears 48 and 50 formed integral therewith.

Figure 3:
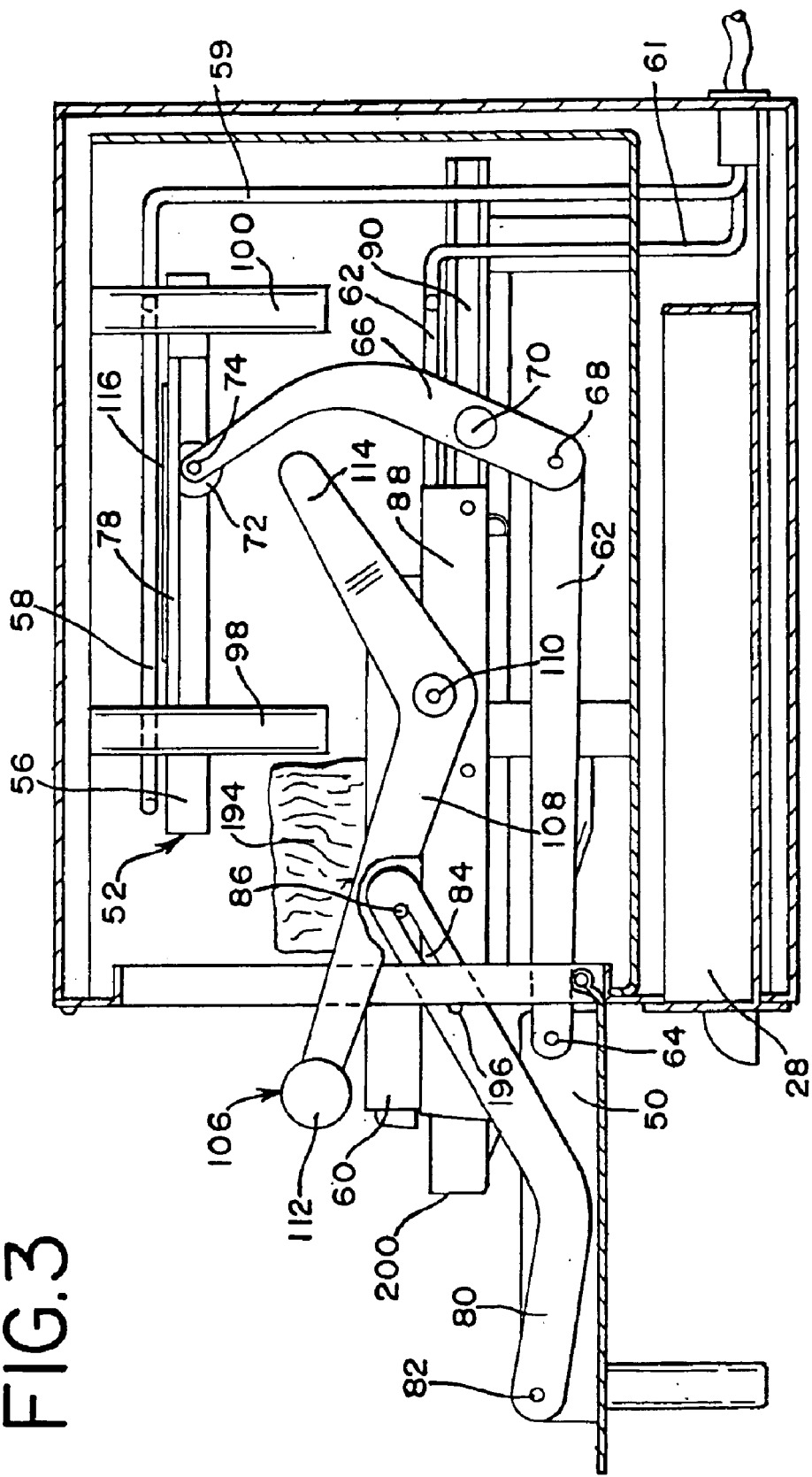
FIG. 3 is a side elevational view of a portion of the grilling oven of FIG. 2 showing the door in an open attitude and a fillet resting on a first grilling unit, a portion of a regulator is shown broken away to show the interconnection between a slotted link and a stud on a lower platen.

Referring now to FIG. 3, one side of a mechanism interconnecting door 38 with an upper grilling unit 52 and a lower grilling unit 54 is shown therein. Upper grilling unit 52 includes a grooved platen 56 with a serpentine electric heating unit 58 in thermal engagement with the platen. The electrical heating unit 58 is electrically connected by cables 59 to a source of electric power through the control assembly 24. In like manner, the lower grilling unit 54 includes a grooved platen 60 with a serpentine electric heating unit mounted on the lower side of the platen and having its construction identical to electrical heating unit 58. The electrical heating unit connected to platen 60 is thermally connected thereto and is electrically connected to the control assembly through cables 61.

Ear 50 has an elongated link 62 connected at one end through a pin 64. The other end of link 62 is connected to a bowed lever 66 through a pin 68 on one end of the bowed lever. Lever 66 pivots on an axle 70 which axle is mounted on housing 34. As may be seen in FIG. 3, lever 66 has a roller 72 mounted on a roller axle 74 at the end opposite to the end connected to link 62. Roller 72 is rotatably mounted in a track 78 connected to one side of platen 56. A slotted link 80 has one end connected to ear 50 through a pin 82. Slotted link 80 includes a slot 84 at the opposite end. A stud 86 connected to platen 60 is slidably mounted in slot 84. The lower platen 60 is mounted on a support 88 which is rotatably supported on a rail 90.

It may be appreciated that only one side of the interconnected linkage between the door and the platens has been described in detail above. The linkage on the other side of the door and the platens is a mirror image of the linkage described above.

Brackets 92 and 94 are secured to platen 56. Each of the brackets 92 and 94 has an identical roller 96 rotatably mounted thereon. Rails 98 and 100 which are parallel to each other and mounted on the housing, as seen in FIG. 2. A second pair of rails 102 and 104 identical to rails 98 and 100 is mounted on the housing opposite to respective rails 98 and 100.

A manual control regulator 106 includes a lever 108 which is mounted on a pivot 110 supported by the housing. The regulator has a handle 112 for moving lever 108 about pivot 110. Lever 108 includes an ear 114 which is engageable with a control flange 116 mounted on platen 56. It may be appreciated that the position of regulator 106 determines the amount that platen 56 may move toward the lower grilling unit 54 thereby determining the spacing between the upper and lower grilling units.

Figure 6:
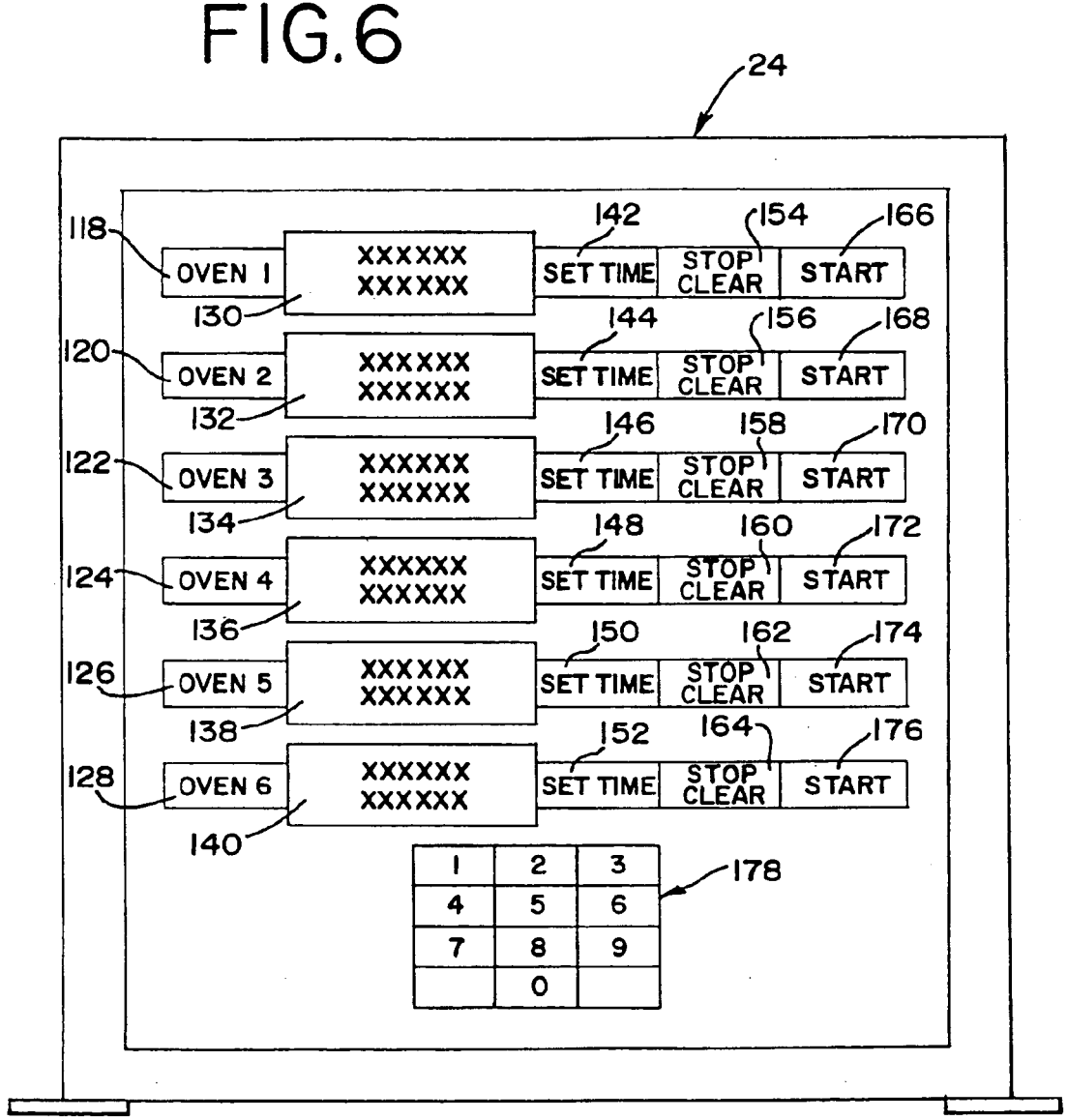
FIG. 6 is a front elevational view of the control assembly in FIG. 1.

The control assembly 24 is a well known and conventional control assembly for controlling the length of time that electricity flows to the heating elements of each of the grilling ovens. The face of the control assembly is shown in FIG. 6. The controls for each grilling oven are in line. Each of grilling ovens 10, 12, 14, 16, 18 and 20 is identified by number in tags 118, 120, 122, 124, 126 and 128, respectively. Readout windows 130, 132, 134, 136, 138 and 140 are positioned adjacent to tags 118, 120, 122, 124, 126 and 128, respectively. Set time switches 142, 144, 146, 148, 150 and 152 are positioned adjacent to respective readout windows 130, 132, 134, 136, 138 and 140. Stop clear switches 154, 156, 158, 160, 162 and 164 are positioned adjacent to respective set time switches 142, 144, 146, 148, 150 and 152. Start switches 166, 168, 170, 172, 174 and 176 are positioned adjacent to the stop clear switches 154, 156, 158, 160, 162 and 164, respectively. A well-known and conventional keypad 178 is positioned below the switches for entering cooking times for each of the individual ovens.

Signal lights 180, 182, 184, 186, 188 and 190 are mounted in each housing for grilling ovens 10, 12, 14, 16, 18 and 20, respectively. Each of the signal lights is connected to the control assembly for its respective oven.

When a selected oven is put into use, the stop clear switch for that oven is actuated, which clears the circuit and extinguishes the signal light for the oven. Next, that oven's set time switch is actuated to allow acceptance of a time from the keypad. Keypad 178 is used to set the numerical number of minutes that electrical energy is to be supplied to the grilling units for the selected oven. The selected time in minutes is displayed on the respective readout window to allow the grilling person to determine whether the proper time for grilling has been keyed into the times through a conventional time circuit. The start switch is actuated so that a conventional timer in the timer circuit for the oven closes the circuit to allow energy to flow to the grilling units in the oven. Upon expiration of the selected time, the flow of energy to the grilling units is interrupted by the timer circuit and the respective signal light is actuated to indicate that the grilling is complete.

The use of grilling oven 18 is described below, however each of the other ovens operates in a like manner. Hinge door 38 is pulled down to open the grilling oven. Downward pivoting of the hinge door moves the slotted link 80. The initial movement of the slotted link causes the slot 84 to slide on stud 86 until the stud engages the oven end 192 of the slot. Then, the stud firmly engages the link to move the lower grilling unit partially into the opening for the grilling oven. Simultaneous with the movement of the lower grilling unit, pivoting of door 38 pulls elongated link 62 into the opening which causes lever 66 to pivot about axle 70 and swing roller 74 upward thereby pushing the upper grilling unit upward away from the lower grilling unit. It may be appreciated that initial movement of the hinge door has no effect on the movement of the lower grilling unit in view of the fact that the length of slot 84 must slide past stud 86 before there is any movement of the lower grilling unit. Thus, there is an initial vertical movement of the upper grilling unit away from the lower grilling unit before there is horizontal movement of the lower grilling unit.

Figure 5:
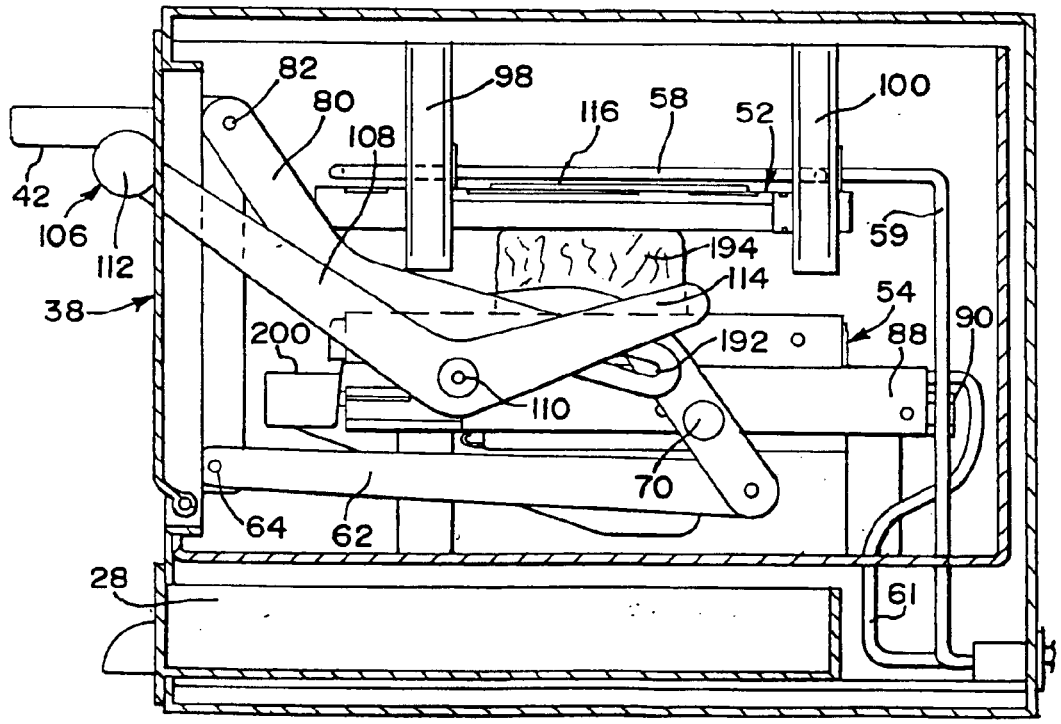
FIG. 5 is a side elevational view of the grilling oven of FIG. 2 with the door closed, but the regulator not connected to the second grilling unit, but rather the second grilling unit resting on a fillet.

Once door 38 is open, the grilling oven may be loaded. Referring now to FIG. 2 by way of example, a beef fillet 194 is positioned on platen 60 of lower grilling unit. Door 38 is pivoted upward to close the door. The upward pivoting of door 38 moves the slotted link 80 causing slot 84 to slide on stud 86 until the stud engages the door end 196 of slot 84. Further pivoting of the door with the stud in engagement with the door end of the slot causes the lower grilling unit to move into the housing. The upward pivoting of door 38 pushes elongated link 62 into the housing pivoting lever 66 about axle 70 to lower roller 74 which allows the upper grilling unit to drop down by the force of gravity. The upper grilling unit drops down until it rests on top of fillet 192 as shown in FIG. 5.

Figure 4:
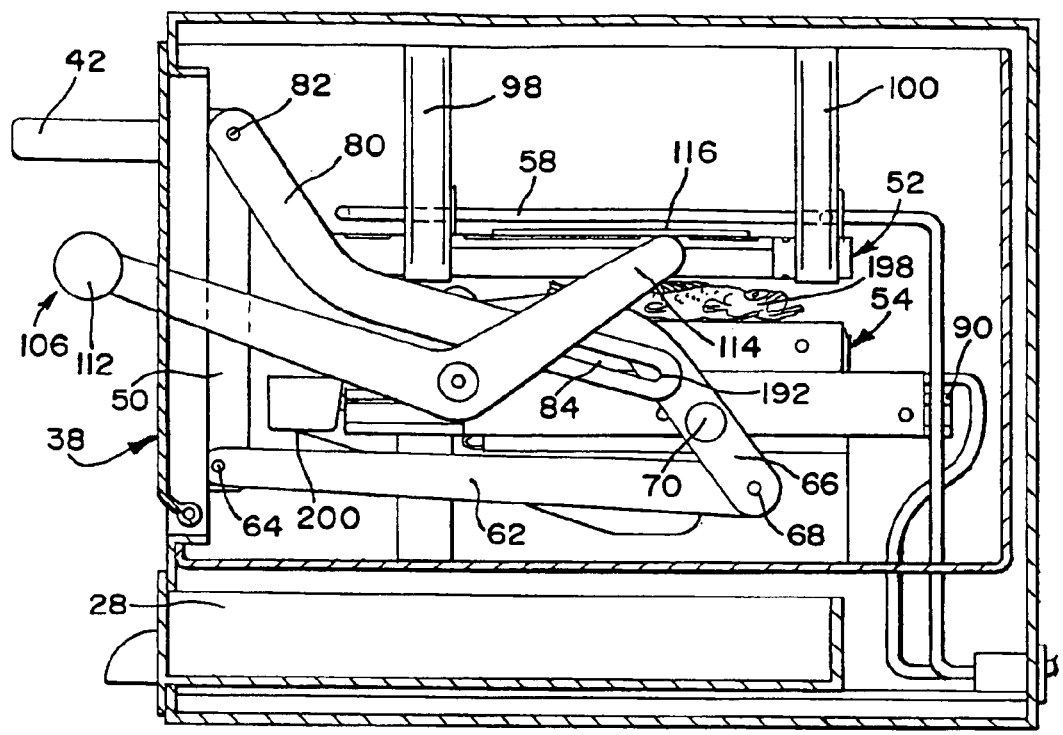
FIG. 4 is a side elevational view of the grilling oven of FIG. 3 but with the door shown in a closed attitude with a fish on the first grilling unit and a regulator holds a second grilling unit spaced away from the fillet.

It may be appreciated that it is desirable for the upper grilling unit to engage the upper surface of certain foods, such as, a beef fillet. However, other foods, such as, fish, may not withstand the weight of the upper grilling unit. A fish 198 is shown in FIG. 4 resting on the lower grilling unit. The descent of the upper grilling unit toward the lower grilling unit is controlled by regulator 102. The cook or grilling person simply moves regulator 102 until the ear of the regulator is in a position to engage flange 78 and thereby prevent the upper grilling unit from coming into engagement with fish 198.

Irrespective of whether the upper grilling unit comes in contact with the food to be cooked or not, it is only necessary for the grilling person to first press the stop clear switch 162 to clear the time circuit, then press the set time switch 150 to activate the time. The grilling person then punches the numerical time on the keypad 178 which is displayed in the window 138. Once the appropriate numerical time is set, start switch 174 is pressed to start the timer and connect the upper and lower grilling units to the source of electrical energy to be heated by their respective heating elements. Upon expiration of the time selected, the timer interrupts the flow of electricity to the heating elements and energizes signal lamp 188 to indicate that the cooking cycle is completed. Door 38 is opened and the food is removed from the grilling oven. Any grease that is generated by the cooking operation flows from the platen to a grease trough 200 positioned below and adjacent to the oven end of the platen. The grease flows from the trough to the grease tray 28 which may be readily removed for cleaning.

It may be appreciated that with the instant station six different grilling times may be utilized, and it is not necessary for the grilling person to keep in mind which grilling oven is used for what purpose. The present arrangement reduces the opportunity for making an error by leaving the food too long on a grill, inasmuch as a time is selected and the grilling is interrupted upon the expiration of the selected time.

Although a grilling station is shown with six grilling ovens, it is readily apparent that a grilling station may contain more or fewer grilling ovens to effect the required cooking in the amount which may be required for an establishment, such as, a restaurant.

Although a detailed description of the present invention has been described in detail above, it is readily apparent that those skilled in the art may make various modifications and changes in the instant invention without departing from the spirit and scope of the present invention. It is to be expressly understood that the instant invention is limited only by the appended claims.

What is claimed is:

1. A grilling station for simultaneously grilling a variety of foods including; a plurality of grilling ovens, each of the grilling ovens having; a housing with a housing opening for loading food into the respective housing, a first grilling unit in each housing for supporting food, and a second grilling in each housing unit positionable above each respective first grilling unit and being vertically moveable relative to the respective first grilling unit; and a control assembly connected to the first and second grilling units in each of the grilling ovens to determine selectively the length of time energy is supplied to the grilling units in each of the ovens to provide selective separate grilling times in each of the ovens.

2. A grilling station for simultaneously grilling a variety of foods as defined in claim 1, wherein each grilling oven includes; a regulator connectable to each respective second grilling unit to limit selectively the distance between each first grilling unit and the respective second grilling unit.

3. A grilling station for simultaneously grilling a variety of foods as defined in claim 1, wherein each grilling oven includes a grease trough connected to the respective first grilling unit to collect grease from that first grilling unit.

4. A grilling station for simultaneously grilling a variety of foods as defined in claim 1, wherein a signal connected to the control assembly is mounted on the housing of each of the grilling ovens to indicate that energy is no longer supplied to the respective first grilling unit.

5. A grilling station for simultaneously grilling a variety of foods as defined in claim 1, including; a door is mounted on the housing for selectively closing the respective housing opening, the first grilling unit of each grilling oven connected to the respective door to move a portion of the first grilling unit into the respective opening when the door opens to move that portion of the first grilling unit into the housing when the door closes, each second grilling unit connected to the respective door to move away from the respective first grilling unit when the door opens and to move toward the first grilling unit when the door closes.

6. A grilling station for simultaneously grilling a variety of foods as defined in claim 1, wherein each grilling oven includes a regulator connectable to the respective second grilling unit to limit selectively the distance between each first grilling unit and the respective second grilling unit, and a grease trough connected to each first grilling unit to collect grease from that first grilling unit.

7. A grilling station for simultaneously grilling a variety of foods as defined in claim 1, whereas each grilling oven includes a regulator connectable to the respective second grilling unit to limit selectively the distance between each first grilling unit and the respective second grilling unit, and a door pivotally connected to each housing for selectively closing the respective opening, the first grilling unit of each grilling oven connected to the respective door to move a portion of the first grilling unit into the opening when the door is opened and to move the first grilling unit into the housing when the door is closed, and each second grilling unit connected to the respective door to move away from the respective first grilling unit when the door is opened.

8. A grilling station for simultaneously grilling a variety of foods as defined in claim 1, wherein each grilling oven includes a grease trough connected to the respective first grilling unit to collect grease from that first grilling unit, and a signal connected to the housing of each of the grilling ovens, each signal connected to the control assembly to indicate that energy is no longer supplied to the respective first grilling unit.

9. A grilling station for simultaneously grilling a variety of foods as defined in claim 1, including; a door pivotally mounted on each housing for selectively closing the opening in the housing, each door connected to a respective first grilling unit to move a portion of the first grilling unit into the opening when the door is opened and to move the first grilling unit into the housing when the door is closed, each door connected to a respective second grilling unit to move the second grilling unit away from the respective first grilling unit when the door is opened, and a regulator in each grilling oven connectable to each second grilling unit to limit selectively the distance between the first grilling unit and the respective second grilling unit.

10. A grilling station for simultaneously grilling a variety of foods as defined in claim 1, including; a door pivotally mounted on each housing for selectively closing the respective opening in the housing, each door connected to a respective first grilling unit to move the first grilling unit toward the opening when the door is opened and to move the first grilling unit into the housing when the door is closed, each second grilling unit connected to a respective door to move away from the first grilling oven when the door is opened, a regulator in each grilling oven connectable to the respective second grilling unit to limit selectively the distance between the first grilling unit and the respective second grilling unit, a grease trough connected to each first grilling unit to collect grease from that first grilling unit, and a signal mounted on the housing of each of the grilling ovens to indicate that energy is no longer supplied to the first grilling unit.

11. A grilling oven for cooking food including; a housing having an opening for loading food into the oven, a first grilling unit movably positioned in the housing for supporting food within the housing, a second grilling unit positioned above the first grilling unit and being vertically moveable relative to the first grilling unit, and a control assembly connected to the first grilling unit and to the second grilling unit to determine selectively the length of time energy is supplied to the grilling units to heat said units.

12. A grilling oven for cooking food as defined in claim 11, including a grease trough connected to the first grilling unit to collect grease from the first grilling unit.

13. A grilling oven for cooking food as defined in claim 11, including a signal mounted on the housing and connected to the control assembly to indicate that energy is no longer supplied to the grilling units.

14. A grilling oven for cooking food as defined in claim 11, including a door pivotally mounted on the housing for selectively closing the opening, said door connected to the first grilling unit to move a portion of the grilling unit into the opening when the door is opened, and said door being connected to the second grilling unit for moving the second grilling unit away from the first grilling unit when the door is opened.

15. A grilling oven for cooking food as defined in claim 11, including a regulator mounted in the housing and connectable to the second grilling unit to limit selectively the distance between the first grilling unit and the second grilling unit.

16. A grilling oven for cooking food as defined in claim 11, including a grease trough connected to the first grilling unit to collect grease from the first grilling unit, said grease trough being positioned adjacent to the opening in the housing and below the first grilling unit, and a signal mounted on the housing and connected to the control assembly to indicate whether energy is being supplied to the grilling unit.

17. A grilling oven for cooking food as defined in claim 11, including a door pivotally mounted on the housing for selectively closing the opening in the housing, said door connected to the first grilling unit to move a portion of the grilling unit into the opening when the door is opened, said door being connected to the second grilling unit for moving the second grilling unit away from the first grilling unit when the door is opened, and a signal mounted on the housing adjacent to the opening, and connected to the control assembly to indicate whether energy is being supplied to the grilling units.

18. A grilling oven for cooking food as defined in claim 11, including a door pivotally mounted on the housing for selectively closing the opening in the housing, said door connected to the first grilling unit to move a portion of the grilling unit into the opening when the door is opened, said door connected to the second grilling unit for moving the second grilling unit away from the first grilling unit when the door is opened, and a regulator mounted in the housing connectable to the second grilling unit to limit selectively the distance between the first grilling unit and the second grilling unit when the door closes the opening in the housing.

19. A grilling oven for cooking food as defined in claim 11, including a grease trough connected to the first grilling unit to collect grease from the first grilling unit, said grease trough being positioned below the upper surface of the first grilling unit and adjacent to the opening in the housing, a door pivotally mounted on the housing for selectively closing the opening in the housing, said door connected to the first grilling unit to move the grilling unit into a position wherein a portion of the grilling unit is in the opening when the door is opened, said door connected to the second grilling unit for moving the second grilling unit away from the first grilling unit when the door is opened, a regulator mounted in the housing connectable to the second grilling unit to limit selectively the distance between the first grilling unit and the second grilling unit when the door is closed, and a signal mounted on the housing adjacent to the opening and connected to the control assembly to indicate whether energy is being supplied to the grilling units.

20. A grilling oven for cooking food as defined in claim 11, including a door pivotally mounted on the housing for selectively closing the opening, said first grilling unit including a platen horizontally movable in the housing, a heating unit thermally connected to the platen and being electrically connected to the control assembly, a slotted link pivotally connected to the door, a stud mounted in said platen, said slotted link including a slot slidably receiving the stud, an elongated link having one end pivotally connected to the door, a pivotal lever pivotally connected to the housing and being pivotally connected to one end of the elongated link, said second grilling unit including a second platen and a second heating unit thermally connected to the second platen, the second heating unit being electrically connected to the control assemble, a pair of tracks mounted in the housing with one track on one side of the second platen and the other track being on the other side of the second platen, a roller mounted in each of the tracks and being connected to the second platen to guide movement of the second platen, said pivotal lever having a roller at one end connected to the second platen to move the second platen away from the first platen when the door is opened, and a manual control regulator pivotally mounted in the housing, said manual control regulator having an ear selectively engageable with the second platen for limiting the space between the second platen and the first platen, said manual control regulator having a handle extending outside of the housing.

* * * * *